(12) United States Patent
Tabirian et al.

(10) Patent No.: US 10,191,296 B1
(45) Date of Patent: Jan. 29, 2019

(54) LASER POINTER WITH REDUCED RISK OF EYE INJURY

(71) Applicant: Beam Engineering for Advanced Measurements Co., Orlando, FL (US)

(72) Inventors: Nelson V. Tabirian, Winter Park, FL (US); David E. Roberts, Apopka, FL (US)

(73) Assignee: Beam Engineering for Advanced Measurements Co., Orlando, FL (US)

( * ) Notice: Subject to any disclaimer, the term of this patent is extended or adjusted under 35 U.S.C. 154(b) by 180 days.

(21) Appl. No.: 15/199,098

(22) Filed: Jun. 30, 2016

Related U.S. Application Data (60) Provisional application No. 62/186,578, filed on Jun. 30, 2015.

(51) Int. Cl.
| | |
|---|---|
| *H01J 40/14* | (2006.01) |
| *G02B 27/28* | (2006.01) |
| *G02B 27/20* | (2006.01) |
| *G02B 5/30* | (2006.01) |

(52) U.S. Cl.
CPC ......... *G02B 27/281* (2013.01); *G02B 5/3016* (2013.01); *G02B 5/3083* (2013.01); *G02B 27/20* (2013.01)

(58) Field of Classification Search
CPC .... G02B 27/20; G02B 27/281; G02B 5/3016; G02B 5/3083
USPC .................................................. 250/225, 216
See application file for complete search history.

(56) References Cited

U.S. PATENT DOCUMENTS

| | | |
|---|---|---|
| 2,435,616 A | 2/1948 | Vittum |
| 3,721,486 A | 3/1973 | Bramley |
| 3,897,136 A | 7/1975 | Bryngdahl |
| 4,160,598 A | 7/1979 | Firester et al. |
| 4,301,023 A | 11/1981 | Schuberth |
| 4,698,816 A | 10/1987 | Chun |
| 4,956,141 A | 9/1990 | Allen |
| 4,983,332 A | 1/1991 | Hahn |
| 5,032,009 A | 7/1991 | Gibbons |
| 5,042,950 A | 8/1991 | Salmon, Jr. |
| 5,047,847 A | 9/1991 | Toda |
| 5,100,231 A | 3/1992 | Sasnett et al. |
| 5,142,411 A | 8/1992 | Fiala |

(Continued)

FOREIGN PATENT DOCUMENTS

| | | |
|---|---|---|
| EP | 1970734 | 9/2008 |
| EP | 2088456 | 12/2009 |

(Continued)

OTHER PUBLICATIONS

Tabirian, N. et al., The Promise of Diffractive Waveplates, Beam Engineering for Advanced Measurements Co., Mar. 2010, pp. 41-45, 6 pages.

(Continued)

*Primary Examiner* — Kevin Pyo
(74) *Attorney, Agent, or Firm* — Brian S. Steinberger; Law Offices of Brian S. Steinberger, P.A.

(57) ABSTRACT

Devices, apparatus, systems and methods for making and using laser pointers and laser illuminators with reduced risk of optical sensor damage such as eye injuries due to laser radiation from the pointer or illuminator, while scattered beams from the laser pointer or laser illuminator are visible to the optical sensor.

12 Claims, 4 Drawing Sheets

(56) References Cited

U.S. PATENT DOCUMENTS

| | | |
|---|---|---|
| 5,150,234 A | 9/1992 | Takahashi |
| 5,218,610 A | 6/1993 | Dixon |
| 5,321,539 A | 6/1994 | Hirabayashi |
| 5,325,218 A | 6/1994 | Willett |
| 5,343,313 A * | 8/1994 | Fergason ............... A61F 9/023 2/6.3 |
| 5,446,596 A | 8/1995 | Mostrorocco |
| 5,619,325 A | 4/1997 | Yoshida |
| 5,621,525 A | 4/1997 | Vogeler et al. |
| 5,712,721 A | 1/1998 | Large |
| 5,895,422 A | 4/1999 | Hauber |
| 5,903,330 A | 5/1999 | Funschilling |
| 5,989,758 A | 11/1999 | Komatsu |
| 6,091,471 A | 7/2000 | Kim |
| 6,107,617 A | 8/2000 | Love et al. |
| 6,139,147 A | 10/2000 | Zhang |
| 6,170,952 B1 | 1/2001 | La Haye et al. |
| 6,191,880 B1 | 2/2001 | Schuster |
| 6,219,185 B1 | 4/2001 | Hyde |
| 6,320,663 B1 | 11/2001 | Ershov |
| 6,373,549 B1 | 4/2002 | Tombling et al. |
| 6,452,145 B1 | 9/2002 | Graves et al. |
| 6,551,531 B1 | 4/2003 | Ford |
| 6,678,042 B2 | 1/2004 | Tabirian et al. |
| 6,728,049 B1 | 4/2004 | Tabirian et al. |
| 6,792,028 B2 | 9/2004 | Cook |
| 6,911,637 B1 | 6/2005 | Vorontsov et al. |
| 7,048,619 B2 | 5/2006 | Park |
| 7,094,304 B2 | 8/2006 | Nystrom |
| 7,095,772 B1 | 8/2006 | Delfyett et al. |
| 7,196,758 B2 | 3/2007 | Crawford |
| 7,319,566 B2 | 1/2008 | Prince |
| 7,324,286 B1 | 1/2008 | Glebov |
| 7,450,213 B2 | 11/2008 | Kim et al. |
| 7,764,426 B2 | 7/2010 | Lipson |
| 8,045,130 B2 | 10/2011 | Son |
| 8,077,388 B2 | 12/2011 | Gerton |
| 8,264,623 B2 | 9/2012 | Marrucci |
| 8,520,170 B2 | 8/2013 | Escuti |
| 8,582,094 B1 | 11/2013 | Shortt |
| 8,643,822 B2 | 2/2014 | Tan et al. |
| 8,937,701 B2 | 1/2015 | Rossini |
| 8,982,313 B2 | 3/2015 | Escuti et al. |
| 9,541,772 B2 | 1/2017 | De Sio et al. |
| 9,557,456 B2 | 1/2017 | Tabirian et al. |
| 9,592,116 B2 | 3/2017 | De Sio et al. |
| 9,617,205 B2 | 4/2017 | Tabirian et al. |
| 9,658,512 B2 | 5/2017 | Tabirian et al. |
| 9,715,048 B2 | 7/2017 | Tabirian et al. |
| 9,753,193 B2 | 9/2017 | Tabirian et al. |
| 9,976,911 B1 | 5/2018 | Tabirian et al. |
| 9,983,479 B2 | 5/2018 | Tabirian et al. |
| 10,031,424 B2 | 7/2018 | Tabirian et al. |
| 10,036,886 B2 | 7/2018 | Tabirian et al. |
| 10,107,945 B2 | 10/2018 | Tabirian et al. |
| 10,114,239 B2 | 10/2018 | Tabirian et al. |
| 10,120,112 B2 | 11/2018 | Tabirian et al. |
| 2001/0002895 A1 | 6/2001 | Kawano |
| 2001/0018612 A1 | 8/2001 | Carson et al. |
| 2001/0030720 A1 | 10/2001 | Ichihashi |
| 2002/0027624 A1 | 3/2002 | Seiberle |
| 2002/0097361 A1 | 7/2002 | Ham |
| 2002/0167639 A1 | 11/2002 | Coates |
| 2003/0021526 A1 | 1/2003 | Bouevitch |
| 2003/0072896 A1 | 4/2003 | Kwok |
| 2003/0137620 A1 | 7/2003 | Wang |
| 2003/0152712 A1 | 8/2003 | Motomura |
| 2003/0206288 A1 | 11/2003 | Tabirian et al. |
| 2003/0214700 A1 | 11/2003 | Sidorin |
| 2003/0218801 A1 | 11/2003 | Korniski et al. |
| 2004/0051846 A1 | 3/2004 | Blum et al. |
| 2004/0081392 A1 | 4/2004 | Li |
| 2004/0105059 A1 | 6/2004 | Ohyama |
| 2004/0165126 A1 | 8/2004 | Ooi et al. |
| 2005/0030457 A1 | 2/2005 | Kuan et al. |
| 2005/0110942 A1 | 5/2005 | Ide |
| 2005/0219696 A1 | 10/2005 | Albert et al. |
| 2005/0271325 A1 | 12/2005 | Anderson et al. |
| 2005/0276537 A1 | 12/2005 | Frisken |
| 2005/0280717 A1 | 12/2005 | Chen |
| 2006/0008649 A1 | 1/2006 | Shinichiro |
| 2006/0055883 A1 | 3/2006 | Morris et al. |
| 2006/0109532 A1 | 5/2006 | Savas |
| 2006/0221449 A1 | 10/2006 | Glebov et al. |
| 2006/0222783 A1 | 10/2006 | Hayashi |
| 2007/0032866 A1 | 2/2007 | Portney |
| 2007/0040469 A1 | 2/2007 | Yacoubian |
| 2007/0115551 A1 | 5/2007 | Spilman |
| 2007/0122573 A1 | 5/2007 | Yasuike |
| 2007/0132930 A1 | 6/2007 | Ryu et al. |
| 2007/0247586 A1 | 10/2007 | Tabirian |
| 2007/0258677 A1 | 11/2007 | Chigrinov |
| 2008/0226844 A1 | 9/2008 | Shemo |
| 2008/0278675 A1 | 11/2008 | Escuti |
| 2009/0002588 A1 | 1/2009 | Lee et al. |
| 2009/0052838 A1 | 2/2009 | McDowall |
| 2009/0073331 A1 | 3/2009 | Shi |
| 2009/0122402 A1 | 5/2009 | Shemo |
| 2009/0141216 A1 | 6/2009 | Marrucci |
| 2009/0201572 A1 | 8/2009 | Yonak |
| 2009/0256977 A1 | 10/2009 | Haddock |
| 2009/0257106 A1 | 10/2009 | Tan |
| 2009/0264707 A1 | 10/2009 | Hendricks |
| 2010/0003605 A1 | 1/2010 | Gil |
| 2010/0066929 A1 | 3/2010 | Shemo |
| 2011/0069377 A1 | 3/2011 | Wu et al. |
| 2011/0075073 A1 | 3/2011 | Oiwa |
| 2011/0085117 A1 | 4/2011 | Moon et al. |
| 2011/0097557 A1 | 4/2011 | May |
| 2011/0109874 A1 | 5/2011 | Piers et al. |
| 2011/0135850 A1 | 6/2011 | Saha et al. |
| 2011/0188120 A1 | 8/2011 | Tabirian et al. |
| 2011/0234944 A1 | 9/2011 | Powers |
| 2011/0262844 A1 | 10/2011 | Tabirian |
| 2012/0140167 A1 | 6/2012 | Blum |
| 2012/0162433 A1 | 6/2012 | Fuentes Gonzalez |
| 2012/0188467 A1 | 7/2012 | Escuti |
| 2012/0275133 A1 * | 11/2012 | Chang ................... G02B 27/20 362/19 |
| 2013/0057814 A1 | 3/2013 | Prushinskiy et al. |
| 2013/0202246 A1 | 8/2013 | Meade |
| 2014/0055740 A1 | 2/2014 | Spaulding |
| 2014/0211145 A1 | 7/2014 | Tabirian |
| 2014/0252666 A1 | 9/2014 | Tabirian |
| 2015/0049487 A1 | 2/2015 | Connor |
| 2015/0081016 A1 | 3/2015 | De Sio et al. |
| 2015/0276997 A1 | 10/2015 | Tabirian et al. |
| 2016/0023993 A1 | 1/2016 | Tabirian |
| 2016/0047955 A1 | 2/2016 | Tabirian et al. |
| 2016/0047956 A1 | 2/2016 | Tabirian et al. |
| 2016/0209560 A1 | 7/2016 | Tabirian et al. |
| 2016/0363484 A1 | 12/2016 | Barak et al. |
| 2016/0363783 A1 | 12/2016 | Blum |
| 2017/0010397 A1 | 1/2017 | Tabirian et al. |

FOREIGN PATENT DOCUMENTS

| | | |
|---|---|---|
| GB | 2209751 | 5/1989 |
| JP | 2001142033 | 5/2001 |
| JP | 2004226752 | 8/2004 |
| WO | 2007122573 | 11/2007 |
| WO | 2008130555 | 10/2008 |
| WO | 2008130559 | 10/2008 |

OTHER PUBLICATIONS

Tabirian, N., Utility U.S. Appl. No. 15/189,551, filed Jun. 22, 2016, Office Action Summary dated Feb. 27, 2018, 16 pages.

Tabiryan, et al., Fabricating Vector Vortex Waveplates for Coronagraphy; Aerospace Conference, 2012, EEE; publicly available Apr. 19, 2012, 12 pages.

Tabirian, et al., PCT Application No. PCT/US15/26186 filed Apr. 16, 2015, Notification of Transmittal of the International Search (56) References Cited

OTHER PUBLICATIONS

Report and the Written Opinion of the International Searching Authority dated Jul. 14, 2015, 17 pages.
Nersisyan, et al., Study of azo dye surface command photoalignment material for photonics applications, Applied Optics, vol. 49, No. 10, Apr. 1, 2010, 8 pages.
Nersisyan, et al., Characterization of optically imprinted polarization gratings, Applied Optics, vol. 48, No. 21, Jul. 20, 2009, 6 pages.
Nersisyan, et al., Fabrication of Liquid Crystal Polymer Axial Waveplates for UV-IR Wavelengths, Optics Express, vol. 17, No. 14, Jul. 2009, 9 pages.
Niersisyan, et al., Optical Axis Gratings in Liquid Crystals and Their Use for Polarization Insensitive Optical Switching, Journal of Nonlinear Optical Physics & Materials, vol. 18, No. 1, 2009, 47 pages.
Nersisyan, et al., Polarization insensitive imaging through polarization gratings, Optics Express, vol. 17, No. 3, Feb. 2, 2009, 14 pages.
Sarkissian, et al., Longitudinally modulated nematic bandgap structure, Optical Society of America, vol. 23, No. 8, Aug. 2008, 6 pages.
Sarkissian, et al., Polarization-universal bandgap in periodically twisted nematics, Optics Letters, vol. 31, No. 11, Jun. 1, 2006, abstract, 4 pages.
Sarkissian, et al., Periodically Aligned Liquid Crystal: Potential Application for Projection Displays, Mol. Cryst. Liq. Cryst, vol. 451, 2006, 19 pages.
Sarkissian, et al., Potential application of Periodically Aligned Liquid Crystal cell for projection displays, JThE12, 2005, 3 pages.
Sarkissian, et al., Polarization-Controlled Switching Between Diffraction Orders in Transverse-Periodically Aligned Nematic Liquid Crystals, Optics Letters, Aug. 2006, abstract, 4 pages.
Schadt, et al., Photo-Induced Alignment and Patterning of Hybrid Liquid Crystalline Polymer Films on Single Substrates, Jpn. J. Appl. Phys., vol. 34, Part 2, No. 6B, Jun. 15, 1995, 4 pages.
Schadt, et al., Photo-Generation of Linearly Polymerized Liquid Crystal Aligning Layers Comprising Novel, Integrated Optically Patterned Retarders and Color Filters, Jpn. J. Appl. Phys., vol. 34, Part 1, No. 6A, Jun. 1995, 10 pages.
Schadt, et al., Optical patterning of multi-domain liquid-crystal displays with wide viewing angles, Nature, vol. 381, May 16, 1996, 4 pages.
Escuti, et al., A Polarization-Independent Liquid Crystal Saptial-Light-Modulator, Liquid Crystals X, Proc. of SPIE, vol. 6332, 2006, 9 pages.
Escuti, et al., Polarization-Independent LC Microdisplays Using Liquid Crystal Polarization Gratings: A Viable Solution (?), Dept of Electrical & Computer Engineering @ ILCC, Jul. 1, 2008, 30 pages.
Escuti, et al., Simplified Spectropolarimetry Using Reactive Mesogen Polarization Gratings, Imaging Spectrometry XI, Proc. of SPIE, vol. 6302, 2006, 11 pages.
Gibbons, et al., Surface-mediated alignment of nematic liquid crystals with polarized laser light, Nature, vol. 351, May 2, 1991, 1 page.
Gibbons, et al., Optically Controlled Alignment of Liquid Crystals: Devices and Applications, Molecular Crystals and Liquid Crystals, vol. 251, 1994, 19 pages.
Gibbons, et al., Optically generated liquid crystal gratings, Appl. Phys. Lett., 65, Nov. 14, 1994, 3 pages.
University of Central Florida, School of Optics CREOL PPCE, Optics in the Southeast, Technical Conference and Tabletop Exhibit, Nov. 12-13, 2003, 9 pages.
Ichimura, et al., Surface assisted photoalignment control of lyotropic liquid crystals, Part 1, Characterization and photoalignment of aqueous solutions of a water soluble dyes as lyotropic liquid crystals, J. Materials. Chem., vol. 12, 2002, abstract, 2 pages.
Ichimura, et al., Reversible Change in Alignment Mode of Nematic Liquid Crystals Regulated Photochemically by "Command Surfaces" Modified with an Azobenzene Monolayer, American Chemical Society, Langmuir, vol. 4, No. 5, 1988, 3 pages.
Zel'Dovich, et al., Devices for displaying visual information, Disclosure, School of Optics/CREOL, University of Central Florida, Jul. 2000, 10 pages.
Provenzano, et al., Highly efficient liquid crystal based diffraction grating induced by polarization holograms at the aligning surfaces, Applied Physics Letter 89, 2006, 4 pages.
Titus, et al., Efficient polarization-independent, re ective liquid crystal phase grating, Applied Physics Letter 71, Oct. 20, 1197, 3 pages.
Chen, et al. An Electrooptically Controlled Liquid-Crystal Diffraction Grating, Applied Physics Letter 67, Oct. 30, 1995, 4 pages.
Kim, et al., Unusual Characteristics of Diffraction Gratings in a Liquid Crystal Cell, Advanced Materials, vol. 14, No. 13-14, Jul. 4, 2002, 7 pages.
Pan, et al., Surface Topography and Alignment Effects in UV-Modified Polyimide Films with Micron Size Patterns, Chinese Journal of Physics, vol. 41, No. 2, Apr. 2003, 8 pages.
Fuh, et al., Dynamic studies of holographic gratings in dye-doped liquid-crystal films, Optics Letter, vol. 26, No. 22, Nov. 15, 2001, 3 pages.
Yu, et al., Polarization Grating of Photoaligned Liquid Crystals with Oppositely Twisted Domain Structures, Molecular Crystals Liquid Crystals, vol. 433, 2005, 7 pages.
Crawford, et al., Liquid-crystal diffraction gratings using polarization holography alignment techniques, Journal of Applied Physics 98, 2005, 10 pages.
Seiberle, et al., 38.1 Invited Paper: Photo-Aligned Anisotropic Optical Thin Films, SID 03 Digest, 2003, 4 pages.
Wen, et al., Nematic liquid-crystal polarization gratings by modification of surface alignment, Applied Optics, vol. 41, No. 7, Mar. 1, 2002, 5 pages.
Anagnostis, et al., Replication produces holographic optics in volume, Laser Focus World, vol. 36, Issue 3, Mar. 1, 2000, 6 pages.
Gale, Replicated Diffractive Optics and Micro-Optics, Optics and Photonics News, Aug. 2003, 6 pages.
McEldowney, et al., Creating vortex retarders using photoaligned LC polymers, Optics Letter, vol. 33, No. 2, Jan. 15, 2008, 3 pages.
Stalder, et al., Lineraly polarized light with axial symmetry generated by liquid-crystal polarization converters, Optics Letters vol. 21, No. 1996, 3 pages.
Kakichashvili, et al., Method for phase polarization recording of holograms, Sov. J. Quantum. Electron, vol. 4, No. 6, Dec. 1974, 5 pages.
Todorov, et al., High-Sensitivity Material With Reversible Photo-Induced Anisotropy, Optics Communications, vol. 47, No. 2, Aug. 15, 1983, 4 pages.
Attia, et al., Anisoptropic Gratings Recorded From Two Circularly Polarized Coherent Waves, Optics Communications, vol. 47, No. 2, Aug. 15, 1983, 6 pages.
Cipparrone, et al., Permanent polarization gratings in photosensitive langmuir blodget films, Applied Physics Letter, vol. 77, No. 14, Oct. 2, 2000, 4 pages.
Nikolova, et al., Diffraction Efficiency and Selectivity of Polarization Holographic Recording, Optica Acta: International Journal of Optics, vol. 31, No. 5, 1984, 11 pages.
Lee et al., "Generation of pretilt angles of liquid crystals on cinnamte-based photoalignment . . . ", Opt., Expr., vol. 17 (26) (Dec. 2009), abstract, 4 pages.
Yaroshchuk et al. "Azodyes as photoalignment agents for polymerizable liquid crystals", IDW'06 Digest vol. 1-3, 2006, 4 pages.
Chigrinov et al. "Anchoring properties of photoaligned azo-dye materials" Phys. Rev., E vol. 68, (Dec. 2003), 5 pages.
Pagliusi et al. Surface-induced photorefractivity in twistable nematics: toward the all-optical control of gain, Opt. Expr. vol. 16, Oct. 2008, 9 pages.
M. Honma, T. Nose, Polarization-independent liquid crystal grating fabricated by microrubbing process, Jpn. J. Appl. Phys., Part 1, vol. 42, 2003, 3 pages.
Tabiryan, et al., Broadband waveplate lenses, Optics Express 7091, vol. 24, No. 7, Mar. 24, 2016, 12 pages.
Tabiryan, et al. Thin waveplate lenses of switchable focal length—new generation in optics, Optics Express 25783, vol. 23, No. 20, Sep. 19, 2015, 12 pages.

(56) References Cited

OTHER PUBLICATIONS

Tabiryan, et al. Superlens in the skies: liquid-crystal-polymer technology for telescopes, Newsroom, 2016, 2 pages.
Nersisyan, et al., The principles of laser beam control with polarization gratings introduced as diffractive waveplates, Proc. of SPIE, vol. 7775, 2010, 10 pages.
Heller, A Giant Leap for Space Telescopes, Foldable Optics, S&TR, Mar. 2003, 7 pages.
Beam Engineering for Advanced Measurements Co., PCT Application No. PCT/US2015026186, The Extended European Search Report, filed on Mar. 8, 2017, 13 pages.
Blinov, et al., Electrooptic Effects in Liquid Crystal MAterials, Springer-Verlag New York, 1994, 17 pages.
Crawford, et al., Liquid Crystals in Complex Geometries; Formed by Polymer and Porous Networks, Taylor and Francis, 1996, 4 pages.
Honma, et al., Liquid-Crystal Fresnel Zone Plate Fabricated by Microrubbing, Japanese Journal of Applied Phsyics, vol. 44, No. 1A, 2005, 4 pages.
Tabirian, N., et al., U.S. Appl. No. 61/757,259, filed Jan. 28, 2013, 29 pages.
Anderson, G., et al., Broadband Antihole Photon Sieve Telescope, Applied Optics, vol. 16, No. 18., Jun. 2007, 3 pages.
Early, J. et al., Twenty Meter Space Telescope Based on Diffractive Fresnel Lens, SPIE, U.S. Department of Energy, Lawrence Livermore National Laboratory, Jun. 2003, 11 pages.
Martinez-Cuenca, et al., Reconfigurable Shack-Hartmann Sensor Without Moving Elements,Optical Society of America, vol. 35, No. 9, May 2010, 3 pages.
Serak, S., et al., High-efficiency 1.5 mm Thick Optical Axis Grating and its Use for Laser Beam Combining, Optical Society of America, vol. 32, No., Jan. 2007, 4 pages.
Ono et al., Effects of phase shift between two photoalignment substances on diffration properties in liquid crystalline grating cells, Appl. Opt. vol. 48, Jan. 2009, 7 pgs.
Naydenova et al., "Diffraction form polarization holographic gratings with surface relief in side chain azobenzene polyesters" J. Opt. Soc. Am. B, vol. 15, (1998), 14 pages.
Oh et al., Achromatic polarization gratings as highly efficent thin-film polarizing beamsplitters for broadband light Proc. SPIE vol. 6682, (2007), 4 pages.
Nersisyan, S., et al., Polarization insensitive imaging through polarization gratins, Optics Express, vol. 17, No. 3, Feb. 2, 2009, 14 pages.
OISE, Optics in the Southeast, Technical Conference and Tabletop Exhibit, Optical Society of America, Orlando, FL., Nov. 12-13, 2003, 9 pages.
Dierking, Polymer Network-Stabilized Liquid Crystals, Advanced Materials, vol. 12, No. 3, 2000, 15 pages.
Beam Engineering for Advaced Measurements Co., et al., PCT Application No. PCT/US2016/038666 filed Jun. 22, 2016, Notification of Transmittal of the International Search Report and the Written Opinion of the International Searching Authority, or the Declaration dated Oct. 10, 2016, 16 pages.
Marrucci, et al., Pancharatnam-Berry phase optical elements for wave front shaping in the visible domain, Appl. Phys. Lett. 88, 2006, 3 pages.
Sobolewska et al., "On the inscription of period and half period surface relief gratings in azobenzene-functionalized polymers", J. Phys. Chem., vol. 112 (15) Jan. 3, 2008, 10 pages.
Barrett et al., Model of laser driven mass transport in thin films of dye-functionalized polymers, J. Chem. Phys., vol. 109 (4), Jul. 22, 1998, 13 pages.
Tabirian, U.S. Appl. No. 14/214,375, filed Mar. 14, 2014, Office Action Summary dated Jun. 27, 2017, 10 pages.
Tabirian, et al., U.S. Appl. No. 14/688,425, filed Apr. 16, 2015, Office Action Summary dated Oct. 5, 2017, 10 pages.
Serak, et al. Diffractive Waveplate Arrays [Invited], Journal of the Optical Society of America B, May 2017, pp. B56-B63, vol. 34, No. 5, 8 pages.
Emoto, Optical and Physical Applications of Photocontrollable Materials: Azobenzene-Containing and Liquid Crystalline Polymers, Polymers,Jan. 2012, 150-186, vol. 4, 38 pages.
Pepper, M. et al, Nonlinear Optical Phase Conjugation, IEEE, Sep. 1991, pp. 21-34, 14 pages.
Tabirian, N., Utility U.S. Appl. No. 14/194,808, filed Mar. 2, 2014, Office Action Summary dated Feb. 9, 2018, 10 pages.
Tabirian, N., Utility U.S. Appl. No. 14/324,126, filed Jul. 4, 2014, Office Action Summary dated Feb. 8, 2018, 13 pages.
De Sio, L., et al., "Digital Polarization Holography Advancing Geometrical Phase Optics," 2016, Optics Express, vol. 24, Issue 16, pp. 18297-18306, 10 pages.
Borek, G. and D. Brown, "High-performance diffractive optics for beam shaping," 1999, Proceeding of SPIE, vol. 3633, pp. 51-60, 10 pages.
Gerchberg, et al, practical algorithm for the determination of the phase from image and diffraction plane pictures, 1972, Optik, vol. 35, Issue 2, pp. 237-246, 10 pages.
Tabirian, et al., Utility U.S. Appl. No. 14/688,197, filed Apr. 16, 2015, Office Action Summary dated Aug. 6, 2018, 19 pages.
Tabirian, et al., Utility U.S. Appl. No. 15/621,553, filed Jun. 13, 2017, Office Action Summary dated Aug. 7, 2018, 11 pages.

* cited by examiner

LASER POINTER WITH REDUCED RISK OF EYE INJURY

CROSS REFERENCE TO RELATED APPLICATIONS

This application claims the benefit of priority to U.S. Provisional Patent Application Ser. No. 62/186,578 filed Jun. 30, 2015. The entire disclosure of the application listed in this paragraph is incorporated herein by specific reference thereto.

FIELD OF INVENTION

This invention relates to laser light pointers and illuminators, and in particular to devices, apparatus, systems and methods for making laser pointers and laser illuminators and using them outdoors with reduced risk of sensor damage, such as eye injuries, due to laser radiation from the laser pointer or laser illuminator.

BACKGROUND AND PRIOR ART

Laser pointers are used both indoors and outdoors. In outdoor use, laser pointers are used to draw attention to particular objects and terrain features. In some outdoor applications, in order to be useful, the laser spot on the illuminated area must be visible from at least 100 meters from the laser spot, and preferably at even greater distances.

At night, even low power, eyesafe laser pointers are sufficient to effectively draw attention when the person observing the laser spot is hundreds of meters from the laser spot. However, during daytime, the laser pointer must have much higher power in order to be visible at distances of 100 meters or more from the laser spot. The reason that high laser pointer output power is needed during the day is that the detection of the laser pointer spot is more difficult when the observer must pick the spot out from the sunlit background.

An additional application of laser pointers is their use by police and military personnel to attract the attention of drivers, in order to allow the police and military personnel to conduct security operations at locations such as highway checkpoints. In this use, higher laser powers are required, especially during the day, in order to assure that drivers of vehicles can be reliably notified by the presence of laser radiation that they are being addressed by the police or military; failure of notification in these situations can have fatal consequences if the driver does not see or recognize the notification provided by the laser pointer. This tends to motivate increases in the power of laser pointers used at such checkpoints.

In those cases in which the beam profile of the laser system has been designed to cover an extended angular area, it is more appropriate to refer to it as a laser illuminator rather than as a laser pointer. These cases may include the use of laser systems by police and military personnel in situations in which it is desired that an area, such as the area of a vehicle windshield, be entirely illuminated by the laser system, rather than only a single small part of the vehicle windshield.

One of the problems with using laser pointers and laser illuminators that produce high optical output power is that such laser pointers and laser illuminators have the capability to produce eye injuries when the pointer or illuminator is accidentally pointed directly into any person's eye from short range. This limits the usefulness of pointers and illuminators used outdoors, especially during the day, because pointer or illuminator optical output power must be restricted in order to keep the risk of accidental eye injuries at an acceptably low level.

To allow the use of laser pointers and laser illuminators at desired ranges, it is necessary to protect personnel from accidental exposure to the beam directly from the laser pointer or laser illuminator. Prior art provides the possibility of incorporating optical filtering into eyewear so that radiation at the wavelength of the laser is blocked, while radiation at other wavelengths is passed by the spectral filter that is included in the eyewear. This prevents eye injuries, while still allowing normal vision through the eyewear. Although this prior art provides protection of personnel wearing appropriately designed eyewear from injuries from laser pointers and laser illuminators, it also defeats one of the purposes of the laser pointer or laser illuminator because not only is radiation blocked when a laser pointer or laser illuminator is accidentally pointed directly at a person wearing such eyewear, it is also blocked when such a person is attempting to see the laser spots or illuminated areas produced by his/her or another's laser pointer or laser illuminator on illuminated objects or terrain features.

To allow operation of laser pointers and laser illuminators outdoors at useful ranges, with low risk of eye injury, it would be highly desirable if the pointer or illuminator and the associated eyewear were such that a direct beam from any pointer or illuminator is blocked by the eyewear, but beams reflected from diffuse objects such as buildings, vegetation, and terrain are visible through the eyewear. This would eliminate eye injuries due to pointers and illuminators pointed directly at the eyes of persons wearing such eyewear, while still allowing observation of laser radiation scattered from diffuse objects. For example, if a group of soldiers or police are manning a checkpoint, and all members of the police or military group are wearing suitable eyewear, then fratricide eye injuries (i.e. injuries due to one soldier or policeman accidentally pointing a laser pointer or laser illuminator into his own eye or the eye of another soldier or policeman at short range) would be completely eliminated.

Furthermore, for additional degree of protection, a nearly collimated beam from a laser pointer can be electronically switched to an illuminator mode, in which a liquid crystal (LC) based device with diffractive waveplate structure as disclosed by Tabiryan et al. in Optics and Photonics News, 21 (3), 41-45, 2010 (N. V. Tabiryan, S. R. Nersisyan, D. M. Steeves and B. R. Kimball, The Promise of Diffractive Waveplates) will be switched to create an extended source that would drastically reduce the distance from the laser pointer at which the laser pointer is an eye hazard and significantly improve its eyesafety characteristics. The switching LC element would allow to switch between multiple states to create various beam profile distributions, divergences not only for eye-safety purposes but also for adapting the pointing/illumination conditions for optimal observation of the pointer/illuminator beam. The switchable LC elements can have a structure of an array of microlenses and phase distribution plates designed to output desired beam profile due to modulation of optical axis orientation of the LC.

Laser pointers and laser illuminators also have the capability to produce damage in optical sensors other than eyes designed to see the spots from laser pointers or objects illuminated by laser illuminators. Thus, it would be useful to provide protection of such other optical sensors from damage by the direct beam from laser pointers and from laser illuminators.

Thus, the need exists for solutions to the above problems with the prior art.

SUMMARY OF THE INVENTION

A primary objective of the present invention is to provide devices, apparatus, systems and methods for making and using laser pointers and laser illuminators with reduced risk of eye injuries or other optical sensor damage due to laser radiation from the pointer or illuminator.

Another objective of the present invention is to provide devices, apparatus, systems and methods of using laser pointers and laser illuminators and matching blocking devices such as eyewear such that laser radiation directly from any pointer or laser illuminator that is part of the system is blocked by the blocking device, but laser radiation from the pointer or laser illuminator that is reflected from objects such as buildings, vegetation, or terrain is visible through the blocking device. This will allow normal functioning of the pointer or illuminator, such that all optical sensors protected by such blocking devices are able to see locations or objects pointed out by use of the pointers or illuminators, but sensor damage including eye injuries due to pointers or illuminators being pointed at close range directly into the protected optical sensor, including eyes of persons equipped with the noted eyewear, are eliminated.

An additional objective of the present invention is to incorporate the system and methods involving blocking of polarized laser radiation with blocking devices with other methods of preventing damage to sensors from laser radiation. These other methods include controlling the spatial properties of the laser beam, including beam propagation direction, shape and profile, power, divergence, and polarization.

A method of protecting an optical sensor from damaging effects of laser pointers and laser illuminators, the method can include the steps of imposing a circular polarization state on radiation of the laser pointers and the laser illuminators, and incorporating a circular polarization blocking device with the optical sensor to protect against radiation induced damage from a laser pointer.

The blocking device can include an optically transparent substrate such as glass, polycarbonate, and fused silica, a layer based on a cholesteric liquid crystalline material system said layer having a reflection bandgap which encompasses the radiation wavelength of the laser pointer. attenuates the transmitted radiation of circular polarization corresponding to the laser pointer by at least approximately 100 times, and provides over approximately 90% transmission for radiation circularly polarized with opposite handedness.

The cholesteric liquid crystal material system can include at least one of: a cholesteric liquid crystal layer, a cholesteric liquid crystal polymer film, a cholesteric liquid crystal composite film, and a polymer networked cholesteric liquid crystal.

A spectral bandwidth of a reflection bandgap of the cholesteric liquid crystalline material system is wider than the bandwidth of the laser pointer radiation.

The reflection bandgap of the cholesteric liquid crystalline material system can be a spectrally broadband comprising wavelengths found in radiation of different laser pointers and laser illuminators, visible and infrared, and includes a wavelength selected from at least one of approximately 532 nm, approximately 633 nm, approximately 700 nm, approximately 800 nm, approximately 1064 nm, and approximately 1550 nm.

The method can further include the steps of providing a linear polarized laser as part of the laser pointer, and providing a quarter-wave retardation film attached to a laser output such that the quarter-wave retardation film converts linear polarization of the laser pointer to circular polarization of selected handedness.

The method can further include the steps of providing an electro-optical beam control system for controlling laser beam properties selected from at least one of beam propagation direction, shape and profile, power, divergence, and polarization.

The electro-optical beam control system can include at least one diffractive waveplate.

The selected handedness can include a right circular polarization.

The optical sensor can be selected from at least one of: an eye, a CCD (charged coupled device), an FPA (focal plane array).

The method can further include the step of attaching the blocking device to a support selected from at least one of: car windows, airplane windows, optical windows, spectacles, goggles, lenses, ophthalmic lenses, and contact lenses.

An optical system can include at least one laser system producing a circularly polarized radiation output comprising an electro-optical beam control system for directing and shaping a laser beam and varying its power, at least one optical sensor for monitoring the laser beam, and a circular polarization blocking device for protecting the optical sensor from the laser beam.

The blocking device can include a blocking layer applied as a coating on a substrate selected from the group consisting of: car windows, airplane windows, optical windows, spectacles, goggles, ballistic goggles, lenses, and contact lenses, wherein the blocking layer includes a cholesteric liquid crystalline material system having reflection bandgap that encompasses the radiation wavelength of the laser pointer, attenuates the transmitted radiation of the circular polarization corresponding to the laser pointer by at least 100 times, and has over 90% transmission for radiation circularly polarized with opposite handedness.

The cholesteric liquid crystal material system can include at least one of: a cholesteric liquid crystal layer, a cholesteric liquid crystal polymer film; a cholesteric liquid crystal composite film, and a polymer networked cholesteric liquid crystal.

A spectral bandwidth of a reflection bandgap of the cholesteric liquid crystalline material system can be wider than the bandwidth of the laser pointer radiation.

The reflection bandgap of the cholesteric liquid crystalline material system is spectrally broadband with wavelengths found in radiation of different types of laser pointers, visible and infrared, the wavelengths being selected from at least one of: approximately 532 nm, approximately 633 nm, approximately 700 nm, approximately 800 nm, approximately 1064 nm, approximately 1550 nm.

The system can further include at least one linear polarized laser, and a quarter-wave retardation film attached to an output of the laser so that the film converts linear polarization of the laser radiation to circular polarization of selected handedness.

The electro-optical beam control system controls laser beam properties can be selected from at least one of: beam pointing, beam steering, beam diffusing and homogenizing, power variation, and beam profiling.

The electro-optical beam control system can include at least one liquid crystalline material based diffractive waveplate.

The liquid crystalline material system includes at least one of: a liquid crystal, a liquid crystal polymer, a liquid crystal composite, and polymer networked liquid crystal.

Further objects and advantages of this invention will be apparent from the following detailed description of the presently preferred embodiments which are illustrated schematically in the accompanying drawings.

DESCRIPTION OF THE PREFERRED EMBODIMENTS

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

In the Summary above and in the Detailed Description of Preferred Embodiments and in the accompanying drawings, reference is made to particular features (including method steps) of the invention. It is to be understood that the disclosure of the invention in this specification does not include all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

The invention relates to methods for reducing the risk of optical sensor damage, including eye injury, from high-power laser pointers and laser illuminators. Such systems may be designed for outdoor use during the day. The methods disclosed will allow the use of laser pointers and laser illuminators with sufficient optical output power to be visible at desired long ranges, including during the day, with a reduced risk of optical sensor damage, such as eye injury to personnel, when the optical sensor is equipped with a blocking device. If the optical sensor is the human eye, the blocking device may be eyewear with design features disclosed herein.

Due to the highly directional and concentrated nature of laser radiation, the risk of optical sensor damage such as eye injury from lasers is in general much greater than the risk of optical sensor damage such as eye injury from incoherent sources such as light bulbs or light emitting diodes of the same optical output power as the laser. For example, a laser with the same optical output power as a 100 watt light bulb is capable of producing eye injuries at ranges of hundreds to thousands a meters from the laser, depending on how well collimated the laser beam is at its point of origin. On the other hand, a 100 watt light bulb presents negligible risk of injury to the human eye.

Although a direct beam from a laser presents a large risk of eye injury if the beam propagates directly from the output of the laser into a an optical sensor, such as a person's eye, when it is reflected from a diffuse surface such as the surface of a building, vegetation, or terrain, it will typically be scattered in all directions, and even a short distance from the scattering surface, there will be no risk of sensor damage, such as injury to the eyes of a person viewing the object from which the laser radiation is scattering.

In order for the radiation scattered from a diffuse surface to be seen by a viewer during the day, it must be bright enough to be perceptible despite having to compete with sunlight. As a result, laser pointers and laser illuminators designed for use during the day by police or military personnel tend to have sufficient output power to present an eye hazard when the output beam is pointed directly into a nearby person's eye. The addition of a conventional blocking filter in the eyewear worn by soldiers and police who use such lasers is highly undesirable because in order to provide a high level of protection from direct beams, the conventional laser filter would make laser spots produced by such laser pointers on objects such as buildings, vegetation, and terrain completely invisible. Similarly, if an optical sensor other than a human eye is designed to be used to view objects pointed out with a laser pointer, or illuminated with a laser illuminator, a conventional laser filter is not acceptable as a means of protecting the optical sensor because it would defeat this design function.

A complete system for minimizing the possibility of optical sensor damage, including damage to human eyes, should also address the need to control the spatial properties of the beam, such as beam propagation direction, shape and profile, power, divergence, and polarization.

The invention can employ a special and novel combination of laser pointers and laser illuminators and blocking devices such as eyewear such that direct beams from the special laser pointers and special laser illuminators are blocked by the blocking devices, yet scattered radiation from the pointers and the laser illuminators is allowed to pass unhindered through the blocking device. This can be accomplished by imposing circular polarization on the output of the special laser pointers and special laser illuminators, and blocking light having this circular polarization by the blocking device. Because scattering by diffuse objects such as buildings, vegetation, and terrain depolarizes laser radiation, light from the laser pointers and laser illuminators would not be blocked by the blocking devices, even though light directly from the special laser pointers and special laser illuminators would be blocked.

In the context of this invention disclosure, a "special laser pointer" and a "special laser illuminator" are a laser pointer and a laser illuminator, respectively, with output radiation that is circularly polarized with a selected handedness, either left-hand circular polarized (LHCP) or right-hand circular polarized (RHCP). A "blocking device" is an optical system that is transparent except that it blocks radiation of one circular polarization in a selected spectral band. "Special eyewear" The system of special laser pointer or special laser illuminator and the associated blocking device is such that radiation from the pointer or illuminator is blocked by the blocking device. This is because the circular polarization that is blocked by the blocking device is the same as the polarization of the radiation emitted by the special laser pointer or special laser illuminator, and the spectral band blocked by the blocking device includes the emission wavelength of the special laser pointer or special laser illuminator.

Figure 1:
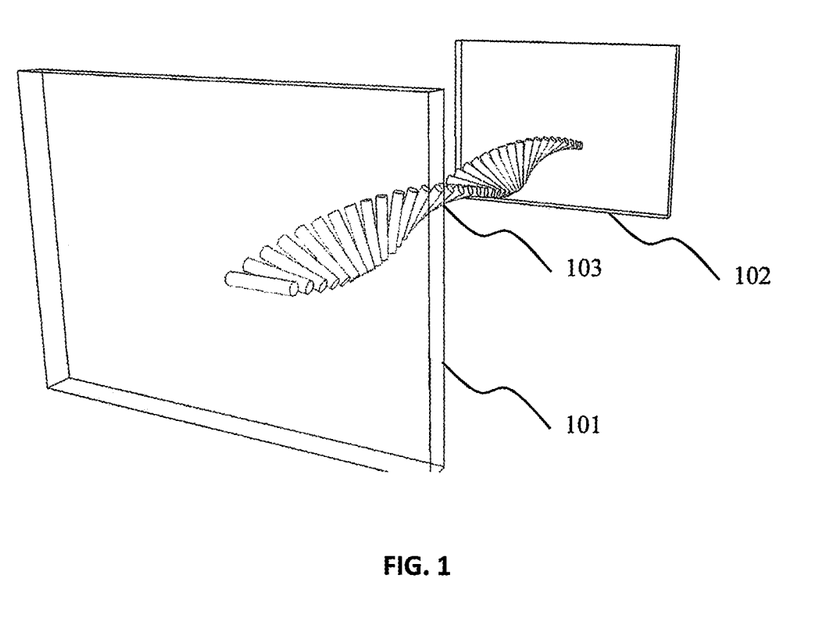
FIG. 1 shows schematically the geometry of a cholesteric liquid crystal with the long axis of the liquid crystal spiral structure oriented perpendicular to the surfaces of the cell containing the liquid crystal material.

Therefore, persons wearing the blocking device such as special eyewear would be able to easily see light from the special laser pointers and laser illuminators that is scattered from diffuse objects, even though the direct beams from the special laser pointers are blocked by the special eyewear. Other optical sensors with such blocking devices would also be capable of imaging such light or other laser radiation that is scattered from any diffuse object, FIG. 1 illustrates a material structure that is proposed for the blocking device, including special eyewear, that will block a narrow spectral band of one circular polarization, but pass all light of any wavelength that has the other circular polarization. Two transparent boundary structures 101 and 102 can have treated surfaces facing the thin layer of cholesteric liquid crystal (CLC) 103, so that the axis of the spiral structure of the CLC is oriented perpendicular to the inner surfaces of the transparent boundary structures 101 and 102. The period of the spiral structures 103 of the CLC can be selected to match the wavelength of the light that is to be reflected. The orientation of the CLC twist is selected to reflect the desired circular polarization of light, while transmitting the other circular polarization. A layer only a few micrometers in thickness with this structure would strongly reflect light of one wavelength and one circular polarization, while passing all light of the other circular polarization regardless of wavelength.

Figure 2A:
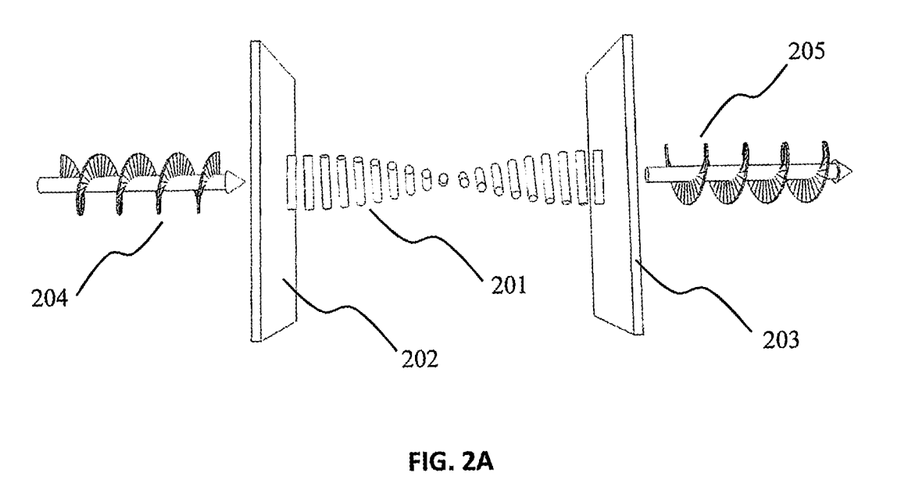
FIGS. 2A and 2B show the effect of a thin layer of appropriately oriented cholesteric liquid crystal on light of the two possible circular polarizations. Light of one of the circular polarizations is reflected from the thin layer of cholesteric liquid crystal, and light of the other circular polarization is transmitted by the thin layer of cholesteric liquid crystal material.
Figure 2B:
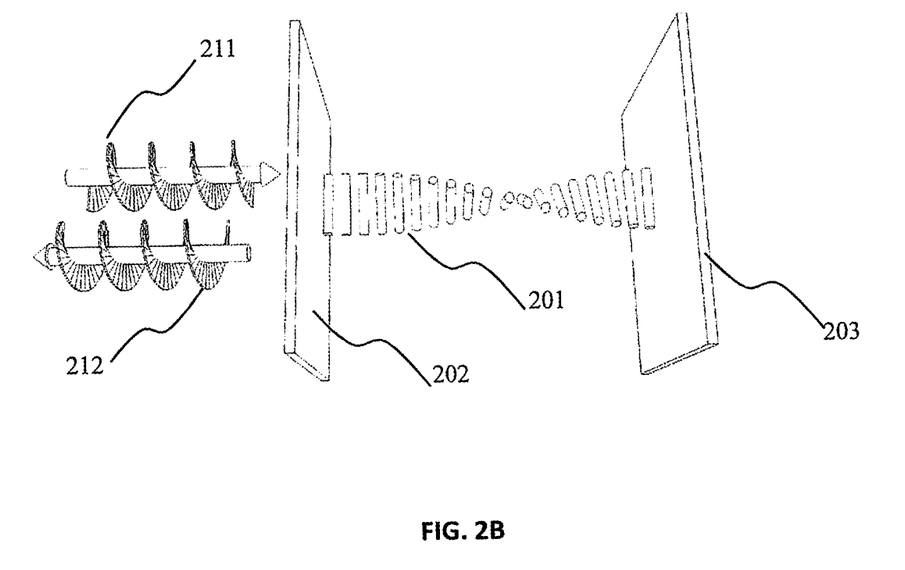

FIGS. 2A and 2B illustrate differential reflection of light by a CLC layer such as the one illustrated in FIG. 1. In FIGS. 2A and 2A, a CLC layer 201 only a few micrometers thick is confined between transparent substrates 202 and 203. The direction of the twist of the CLC molecular axes is selected to reflect light of a specific circular polarization, while transmitting light of the other polarization. The period of the twist in the CLC molecules is selected to reflect light within only a narrow band of wavelengths. In FIG. 2A, incident light 204 of one circular polarization is transmitted through the transparent substrates 202 and 203 and through the CLC layer 201, resulting in an output beam 205. In FIG. 2B, incident light 211 of the other circular polarization is reflected from the CLC layer, resulting in a reflected beam 212.

Figure 3:
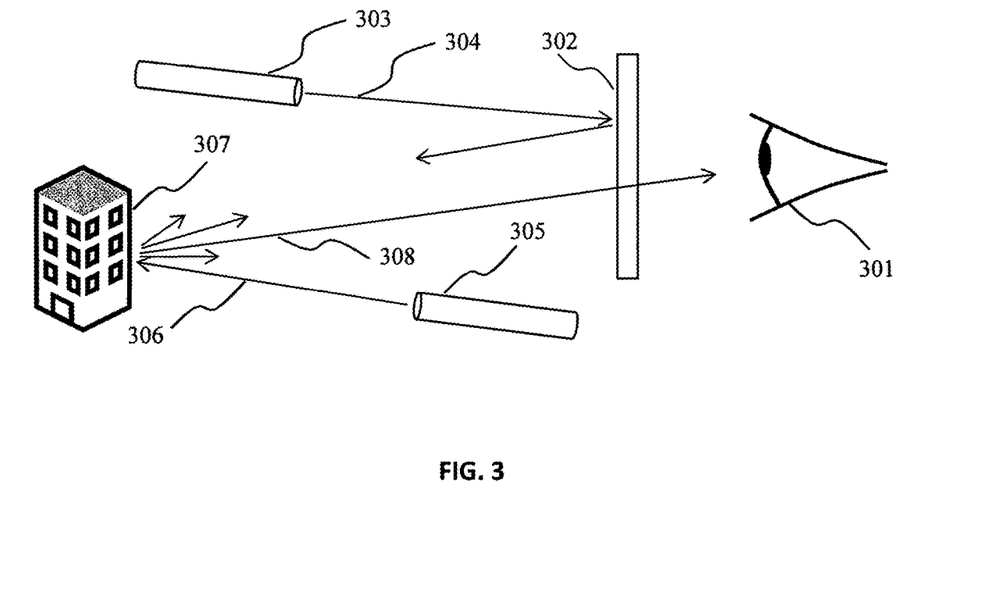
FIG. 3 illustrates reflection by a thin layer of cholesteric liquid crystal material of light propagating directly from a laser pointer or laser illuminator of suitable design, and transmission through the same thin layer of cholesteric liquid crystal of scattered light from a pointer or illuminator of the same design.

Application of the disclosed combination of special laser pointers and special eyewear is illustrated in FIG. 3. In this figure, a user's eye 301 is protected by eyewear 302 that includes the thin CLC layer disclosed earlier. A special laser pointer or special laser illuminator 303 transmits a circularly polarized output beam 304, which is reflected from the blocking device such as eyewear 302. Another such special laser pointer or special laser illuminator 305 also produces a circularly polarized output beam 306 having the same circular polarization as the beam 304 produced by laser pointer or laser illuminator 303. The output beam 306 is depolarized when it is scattered from any diffuse object 307, such that scattered radiation 308 is transmitted through the blocking device such as eyewear 302 to the user's eye 301. The special laser pointers 303 and 305 may include an electro-optical beam control system that allows adjustment of beam parameters such as beam propagation direction, shape, profile, optical power, divergence, and polarization. The schematic of an eye in FIG. 3 represents either a human eye or an alternative imager.

Figure 4:
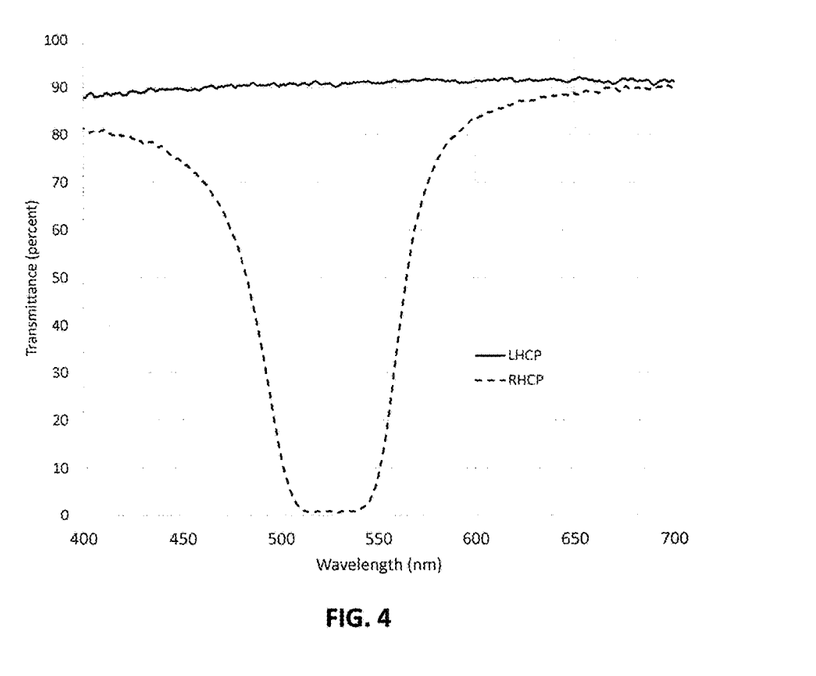
FIG. 4 shows the result of optical transmittance measurements for the two circular polarization states of light through a thin layer of cholesteric liquid crystal designed to reflect laser radiation of one circular polarization, and transmit laser radiation of the other circular polarization.

FIG. 4 shows the measured optical transmittance of a thin layer of cholesteric liquid crystal designed to transmit light of any visible wavelength that is left-hand circularly polarized (LHCP), and reflect light near 530 nm wavelength that is right-hand circularly polarized (RHCP). Eyewear that contains such a thin layer would be suitable for the use in the eyewear 302 illustrated in FIG. 3, provided the output of the lasers 303 and 305 in FIG. 3 are right-hand circularly polarized.

Figure 5:
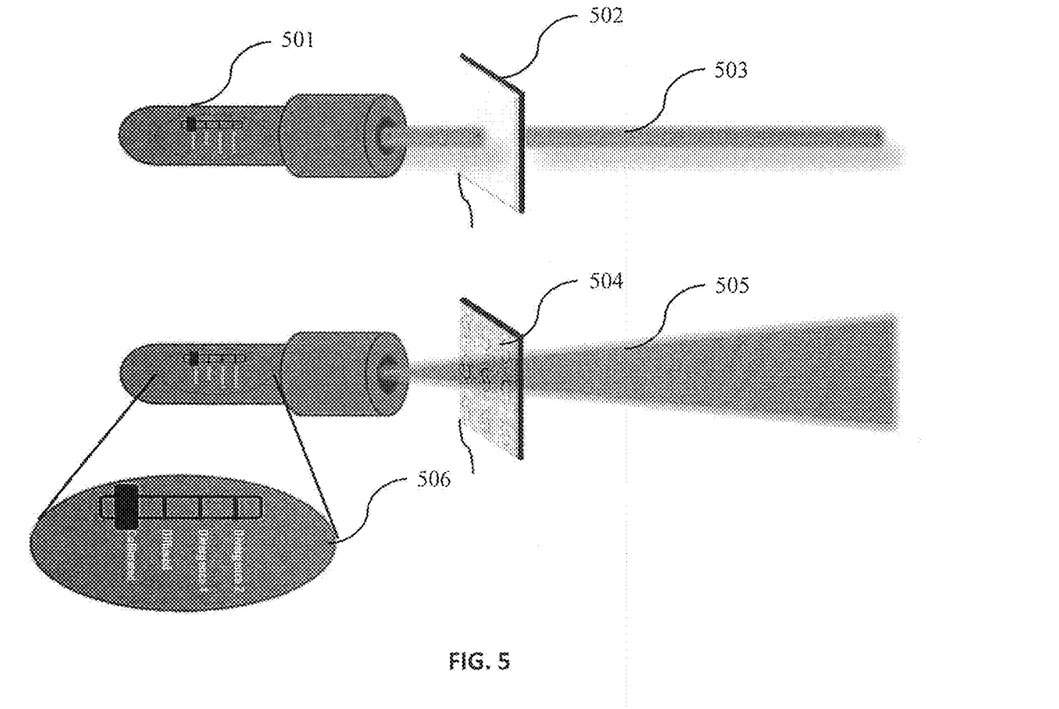
FIG. 5 shows schematically the laser pointer/illuminator with electrically switched liquid crystal (LC) based diffractive waveplate array structure or phase plate in different states to create various beam profile distributions and divergences, to achieve eye-safety and for adjustment of the pointing/illumination conditions for optimal observation of the pointer/illuminator beam.

FIG. 5 illustrates a method by which a nearly collimated beam 503 of a laser pointer 501 can be electronically switched to an illuminator mode, in which a liquid crystal based device with diffractive waveplate structure can be either in a state 502 in which it does not affect the propagation of the beam 503, or in a state 504 in which its action is to create a diverged beam 505. When the beam is in the diverged state 505, it is hazardous only at short range, whereas it will be hazardous at much greater range when it is in a collimated state 503. The electro-optical beam control system included in the laser pointer or laser illuminator system would contain a switching element 506 that would allow switching among multiple states to create various beam profile distributions, and divergencies, not only for eye safety purposes but also for adapting the pointing/illumination conditions for optimal observation of the pointer/illuminator beam.

To a good approximation, it can be assumed that the half of the laser light scattered from a diffuse object is in one of the circular polarization states, and half is in the other circular polarization state. Thus, if the CLC layer blocks one circular polarization of light at the operating wavelength and passes the other circular polarization at that wavelength, only half of the light scattered from diffuse objects would be passed by the eyewear. This would result in a slight reduction in the range at which the person wearing the eyewear would be able to detect a laser spot on a diffuse object, but the benefit would be that this person would not be subject to injury by beams from the previously described special laser pointers pointed directly at his or her eye.

Although the embodiments of the blocking device described here are in terms of a cholesteric liquid crystal layer, it will be evident to one of ordinary skill in the art that there are other structures that can also provide the essential feature of blocking a narrow spectral band of light or other electromagnetic radiation having one particular circular polarization, and passing light or other electromagnetic radiation of the other circular polarization. These other structures include, but are not limited to, cholesteric liquid crystal polymer film, cholesteric liquid crystal composite film, and polymer networked cholesteric liquid crystal. Any of these structures can be used in the blocking device to block light or other electromagnetic radiation of one circular polarization in a selected spectral band, and pass the other circular polarization. In describing the characteristics of all of these structures, it is often useful to introduce the concept of a reflection bandgap, which defines the spectral region over which the structure reflects light or other electromagnetic radiation.

In some embodiments, the laser pointer or laser illuminator may be controlled by an electro-optical beam control system that is used to control such beam properties as beam propagation direction, shape and profile, power, divergence, and polarization.

The term "approximately" can be +/−10% of the amount referenced. Additionally, preferred amounts and ranges can include the amounts and ranges referenced without the prefix of being approximately.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A transmittive method of protecting an optical sensor from damaging effects of laser pointers and laser illuminators, the method comprising:
    imposing a circular polarization state on radiation of the laser pointers and the laser illuminators said circular polarization handedness being one of right-hand or left hand; and
    incorporating with the optical sensor a thin layer of a material capable of blocking light:
    (a) within a spectral range encompassing the wavelengths of laser pointers and the laser illuminators;
    (b) having the circular polarization handedness imposed on the laser pointers and the laser illuminators; and
    (c) said material transmitting light of circular polarization handedness opposite to the circular polarization handedness imposed on radiation of the laser pointers and the laser illuminators.

2. The method of claim 1, wherein the blocking material layer comprises
    an optically transparent substrate such as glass, polycarbonate, and fused silica;
    a layer based on a cholesteric liquid crystalline material system said layer having a reflection bandgap which encompasses the radiation wavelength of the laser pointer, attenuates the transmitted radiation of circular polarization corresponding to the laser pointer by at least approximately 100 times; and
    provides over approximately 90% transmission for radiation circularly polarized with opposite handedness.

3. The method of claim 2 wherein the cholesteric liquid crystal material system comprises at least one of: a cholesteric liquid crystal layer, a cholesteric liquid crystal polymer film, a cholesteric liquid crystal composite film, and a polymer networked cholesteric liquid crystal.

4. The method of claim 3 wherein a spectral bandwidth of a reflection bandgap of the cholesteric liquid crystalline material system is wider than the bandwidth of the laser pointer and laser illuminator radiation.

5. The method of claim 4 wherein the reflection bandgap of the cholesteric liquid crystalline material system is spectrally broadband comprising wavelengths found in radiation of different laser pointers and laser illuminators, visible and infrared, and includes a wavelength selected from at least one of approximately 532 nm, approximately 633 nm, approximately 700 nm, approximately 800 nm, approximately 1064 nm, and approximately 1550 nm.

6. The method of claim 1, further comprising the steps of:
    providing a linear polarized laser as part of the laser pointer; and
    providing a quarter-wave retardation film attached to a laser output such that the quarter-wave retardation film converts linear polarization of the laser pointer to circular polarization of selected handedness.

7. The method of claim 1 wherein the optical sensor is selected from at least one of: an eye, a CCD (charged coupled device), an FPA (focal plane array).

8. The method of claim 1 further comprising the step of:
    attaching the blocking device to a support selected from at least one of: car windows, airplane windows, optical windows, spectacles, goggles, lenses, ophthalmic lenses, and contact lenses.

9. An optical system comprising:
    at least one laser system producing a circularly polarized radiation output comprising an electro-optical beam control system for directing and shaping a laser beam and varying its power;
    at least one optical sensor for monitoring the laser beams;
    a circular polarization blocking device for protecting the optical sensor form the laser beams, wherein the blocking device comprises:
    a blocking layer applied as a coating on a substrate selected from the group consisting of: car windows, airplane windows, optical windows, spectacles, goggles, ballistic goggles, lenses, and contact lenses;
    wherein the blocking layer includes a cholesteric liquid crystalline material system having reflection bandgap that encompasses the radiation wavelength of the laser pointer, attenuates the transmitted radiation of the circular polarization corresponding to the laser pointer by at least approximately 100 times, and has over approximately 90% transmission for radiation circularly polarized with opposite handedness.

10. The system of claim 9, wherein the cholesteric liquid crystal material system comprises at least one of: a cholesteric liquid crystal layer, a cholesteric liquid crystal polymer film; a cholesteric liquid crystal composite film, and a polymer networked cholesteric liquid crystal.

11. The system of claim 10 wherein a spectral bandwidth of a reflection bandgap of the cholesteric liquid crystalline material system is wider than the bandwidth of the laser pointer radiation.

12. The system of claim 11 wherein the reflection bandgap of the cholesteric liquid crystalline material system is spectrally broadband with wavelengths found in radiation of different types of laser pointers, visible and infrared, the wavelengths being selected from at least one of: approximately 532 nm, approximately 633 nm, approximately 700 nm, approximately 800 nm, approximately 1064 nm, approximately 1550 nm.

\* \* \* \* \*